(12) United States Patent
Schweitzer (10) Patent No.: US 11,337,384 B2
(45) Date of Patent: May 24, 2022

(54) IRRIGATION SYSTEM AND METHOD FOR CONTROLLING LIQUID FLOW IN ADJACENT FIELD ZONES

(71) Applicant: Netafim, Ltd., Tel Aviv (IL)

(72) Inventor: Abraham Schweitzer, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 349 days.

(21) Appl. No.: 16/744,347

(22) Filed: Jan. 16, 2020

(65) Prior Publication Data

US 2020/0146230 A1    May 14, 2020

Related U.S. Application Data

(63) Continuation-in-part of application No. PCT/IB2018/055263, filed on Jul. 16, 2018.

(60) Provisional application No. 62/534,708, filed on Jul. 20, 2017.

(51) Int. Cl.
  *A01G 25/16* (2006.01)
  *A01G 25/02* (2006.01)

(52) U.S. Cl.
  CPC .......... *A01G 25/16* (2013.01); *A01G 25/023* (2013.01); *Y10T 137/87877* (2015.04); *Y10T 137/87893* (2015.04); *Y10T 137/87917* (2015.04); *Y10T 137/87925* (2015.04); *Y10T 137/87981* (2015.04)

(58) Field of Classification Search
  CPC .... A01G 25/023; A01G 25/16; A01G 25/162; Y10T 137/87877–87909; Y10T 137/87917–88062
  See application file for complete search history.

(56) References Cited

U.S. PATENT DOCUMENTS

| 2,360,321 | A | | 10/1944 | Griswold |
| 2,952,273 | A | | 9/1960 | Griswold |
| 3,000,398 | A | | 9/1962 | Link |
| 3,964,685 | A | * | 6/1976 | Chauvigne ........... A01G 25/162 239/66 |
| 4,733,685 | A | * | 3/1988 | Bron .................... A01G 25/162 137/119.06 |

(Continued)

FOREIGN PATENT DOCUMENTS

| AU | 492 484 B2 | 9/1975 |
| AU | 492484 B2 | 9/1975 |

OTHER PUBLICATIONS

International Search Report dated Mar. 14, 2019, in counterpart International (PCT) Application No. PCT/IB2018/055263.

(Continued)

*Primary Examiner* — Matthew W Jellett
(74) *Attorney, Agent, or Firm* — Womble Bond Dickinson (US) LLP (57) ABSTRACT

An irrigation column for a drip irrigation system has a fluid conducting line for receiving fluid from a fluid source upstream. The irrigation column further includes a plurality of drip line segments extending alongside the fluid conducting line, a plurality of zone valves located along the fluid conducting line, and a plurality of control tubes extending alongside the fluid conducting line. And each control tube is in fluid communication with a respective one of the zone valves for actuating the zone valve.

31 Claims, 6 Drawing Sheets

(56) References Cited

U.S. PATENT DOCUMENTS

| | | | | |
|---|---|---|---|---|
| 5,535,778 | A * | 7/1996 | Zakai | F16K 21/06 251/16 |
| 6,302,338 | B1 * | 10/2001 | Cohen | F16K 15/148 137/854 |
| 9,693,511 | B2 * | 7/2017 | Bermudez Rodriguez | A01G 25/165 |
| 10,251,348 | B2 * | 4/2019 | Bermudez Rodriguez | A01G 25/16 |
| 10,420,294 | B2 | 9/2019 | Socolsky et al. | |
| 10,874,061 | B1 * | 12/2020 | Vinokur | A01G 25/02 |
| 2009/0145974 | A1 | 6/2009 | Fekete | |
| 2014/0252103 | A1 | 9/2014 | Hamann et al. | |
| 2014/0252117 | A1 | 9/2014 | Hamann et al. | |
| 2018/0352759 | A1 | 12/2018 | Socolsky et al. | |
| 2018/0359963 | A1 | 12/2018 | Schweitzer et al. | |

OTHER PUBLICATIONS

Written Opinion dated Mar. 14, 2019, in counterpart International (PCT) Application No. PCT/IB2018/055263.

\* cited by examiner

IRRIGATION SYSTEM AND METHOD FOR CONTROLLING LIQUID FLOW IN ADJACENT FIELD ZONES

RELATED APPLICATIONS

This is a Bypass Continuation-in-Part of PCT/IB2018/055263, filed Jul. 16, 2018 and published as WO 2019/016684A2. Priority is claimed to U.S. Provisional Patent Application No. 62/534,708, filed Jul. 20, 2017. The contents of the aforementioned applications are incorporated by reference in their entirety.

TECHNICAL FIELD

Embodiments of the invention relate to an irrigation system and method, in particular for use in precision agriculture.

BACKGROUND

Precision agriculture involves obtaining large amounts of data relating to condition of a crop at a high spatial resolution, in order to address variability of e.g. agricultural land and crop. This agricultural approach includes utilizing technologies such as global positioning systems (GPS), Geographical information systems (GIS), yield monitoring and technologies for remote and/or proximal sensing.

Technologies for monitoring or sensing crops may utilize airborne sensors mounted on crafts, such as: satellites, airplanes, unmanned aerial vehicles (drones), hot-air balloons (and the like). Ground sensors may also be used, such as a vehicle mounted sensors (e.g. on tractors) for monitoring crops from a proximal distance; or on poles, masts or towers for monitoring crops in a field from above. Proximal sensing may include also a mesh of local fixed sensors.

Sensors commonly used for precise agriculture can be hyper and multi spectral cameras, such as the type manufactured by TETRACAM Inc. that may e.g. capture few bands in the spectrum of 400 nm-10 µm. Other sensing methods may make use of thermal cameras to evaluate water status in plants by temperature reading of the canopy. FLIR Systems Inc. is known to offer wide range of thermal cameras that can be mounted on aircrafts or poles and also light weight mini thermal cameras that can be mounted on drones.

Spatial information gathered from sensors may be used to determine the spatial variability of vegetation or plant water content in the field. This information may be used to derive indexes indicative e.g. of crop or vegetation condition. Such indexes may include stress indexes such as Crop Water Stress Index (CWSI) derived from sensors obtaining temperature measurements of crops. Other indexes may include soil and vegetation indexes, such as Normalized difference vegetative index (NDVI) derived e.g. from high spectral imagery and based on optical reflectivity of plants. Using such indexes may assist in determining e.g. an irrigation recommendation and scheduling.

Crop growth can be affected by the administration via irrigation of various substances such as water, fertilizers, fungicides, herbicides, pesticides (and the like). At least some of said substances such as fungicides, herbicides, pesticides may be collectively called crop protection products. By accurately monitoring a crop it can be possible to arrive at the quantity, location and timing of e.g. irrigation of fertilizing a field in order to reduce crop variability, increase yield and reduce inputs costs. A field may be divided into zones according to e.g. a required irrigation resolution.

A minimal area in a field monitored by an imaging device may be defined by the pixel resolution of the imaging device, while the actual zone size by crop spatial variability characteristics. Such minimal area may be the coverage area that each pixel in such sensor monitors in a field or sub-pixel area within the pixel coverage. Therefore, a zone derived from technology utilizing an imaging device, may range in size from the area that each pixel (or sub-pixel) covers in a field to a cluster of one or more of such areas. In fields monitored by e.g. technologies utilizing vehicle mounted sensors, a minimal size of zone may be more flexibly defined.

Pixels, for example in a satellite image, may cover areas in the range of resolution of about 1 square meter to about 100 square meters (even 1000 m3) in a field at ground level. Consequently, using such data can derive an irrigation recommendation, plan and/or regime tailored to distinct zones in a field. Attempts have been made to derive irrigation scheduling on the basis of remote or proximal sensed crops.

Bellvert et al, in an article entitled "scheduling vineyard irrigation based on mapping leaf water potential from airborne thermal imagery", Precision agriculture '13 (2013); describe using an irrigation system divided into sectors and then taking individual irrigation decisions for each sector based on sensed information.

Sanchez et al, in an article entitled "effect of a variable rate irrigation strategy on the variability of crop production in wine grapes in California", ISPA $12^{th}$ conference; describe an irrigation system including water valves, flow meters, power and electronics components as well as a central computer, antenna and wireless modem for remote access and control of the system. Hoses are used in the system fastened to wires running back and forth along the vine row.

SUMMARY

The following embodiments and aspects thereof are described and illustrated in conjunction with systems, tools and methods which are meant to be exemplary and illustrative, not limiting in scope.

In an embodiment there is provided an irrigation column for a drip irrigation system comprising: a fluid conducting line for receiving fluid from a fluid source upstream, a plurality of drip line segments extending alongside the fluid conducting line, a plurality of zone valves located along the fluid conducting line, and a plurality of control tubes extending alongside the fluid conducting line, wherein each control tube being in fluid communication with a respective one of the zone valves for actuating the zone valve.

Possibly, each zone valve can be actuated to an open state upon receipt of a control signal via the control tube in communication therewith, wherein preferably the control signal is a hydraulic control signal.

If desired each zone valve is configured to permit downstream flow to a respective drip line segment located downstream upon actuation.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1:
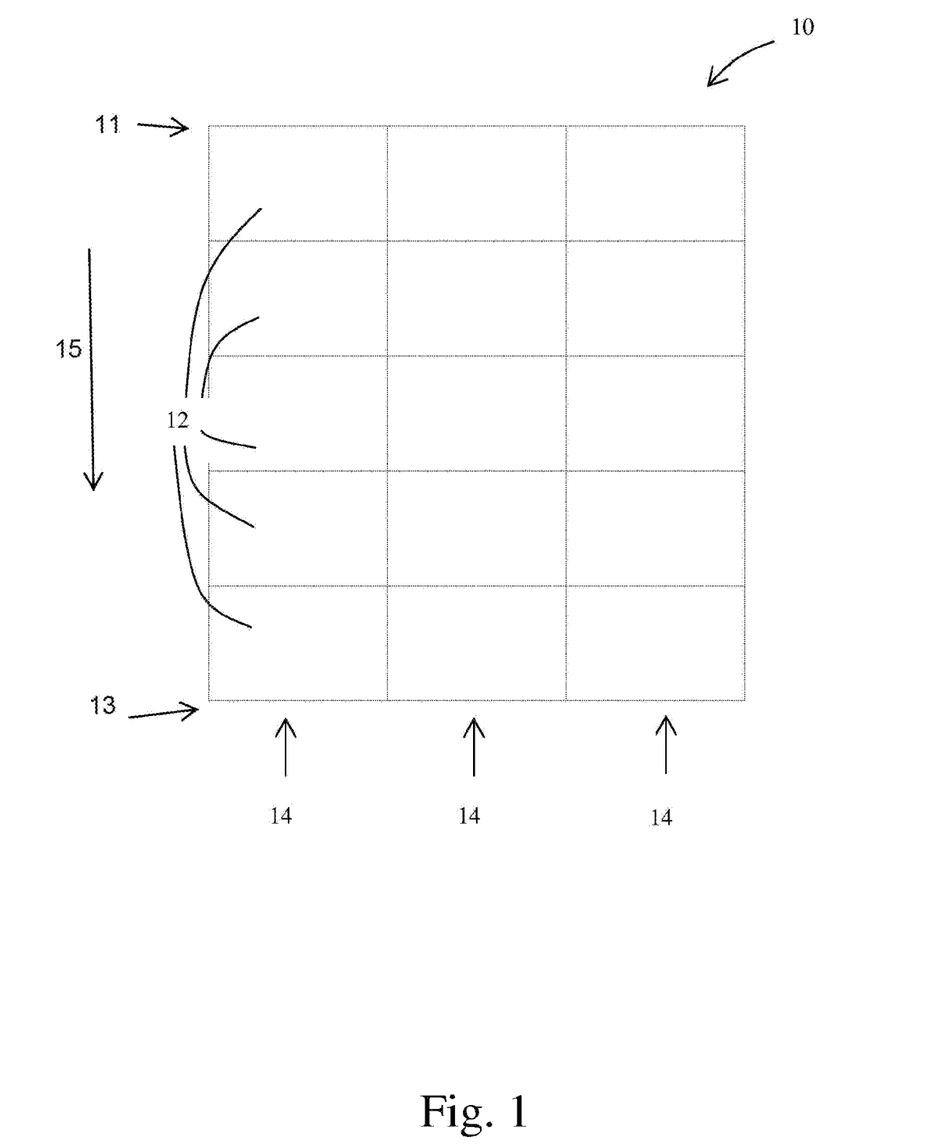
FIG. 1 schematically shows a field divided into zones according to various embodiments of the present invention.

Attention is first drawn to FIG. 1 showing a field 10 in which precision agriculture and/or irrigation is intended to be used. The field 10 has an upstream end 11 and a downstream end 13, together defining an upstream-to-downstream direction 15 indicated by the arrow. In an exemplary embodiment, field 10 may be divided into zones 12, here an optional matrix or array of 'three' by 'five' zones 12. In embodiments of the invention, any array size may be possible, with the number of rows not necessarily corresponding in number to the number of columns and not all columns or rows having equal number of zones and/or not all zones being of similar size and/or shape. Field 10 may be defined as including field-strips 14 including each several zones 12, in this example, 'five' zones. The strips 14 may extend one alongside the other. In field 10, each of the three field strips 14 shown may be considered to be a "column" comprising five zones 12.

The size of a zone 12 may define a minimal resolution/area to which irrigation may be provided in field 10. Such size or resolution may be the result of consideration(s), such as, the type of crops being grown in field 10, the variability in the soil in the field, the topography of the field (etc.). The smallest possible zone size, in certain embodiments, may be the result of the data or information used for precision agriculture in field 10. Such data may be based in some embodiments, inter alia, on information from sensors monitoring the field.

Sensors used for deriving data in precision agriculture, in accordance with some embodiments of the invention, may include airborne sensors mounted on crafts, such as: satellites, airplanes, unmanned aerial vehicles (drones), hot-air balloons (and the like). Ground sensors may also be used, such as a vehicle mounted sensors (e.g. on tractors) and/or ground or plant zone specific stationary sensors; for monitoring crops from a proximal distance. Sensors mounted on poles, masts or towers for monitoring crops in a field from above may also be used for deriving the data for the precision agriculture.

Pixel resolution of an imaging device monitoring a field, may in some cases define a minimum size area covered in a field. Consequently, the smallest possible size zone 12 may be defined by the area that such pixel covers in a field. In fields monitored by other techniques, such as by vehicle mounted sensors, larger flexibility may be available for defining such zone size. In certain embodiments, zone 12 may also be defined by a cluster of areas each covered by a single (or plurality) of pixels. In some embodiments sub-pixel resolution may also be used to define a minimal area monitored in a field, by taking for example an area monitored/viewed by a single pixel and dividing it into several zones.

Zone size may thus at least in certain embodiments of the invention be determined by the actual field spatial variability to which preferably a dedicated irrigation schedule distinct from other field areas (zones), would be beneficial for enhancing e.g. crop yield in the field. Thus such zone size (possible smaller than pixel resolution) would in this case be defined not by the pixel resolution of the imaging device or at least would not be constrained by such resolution.

Figure 2:
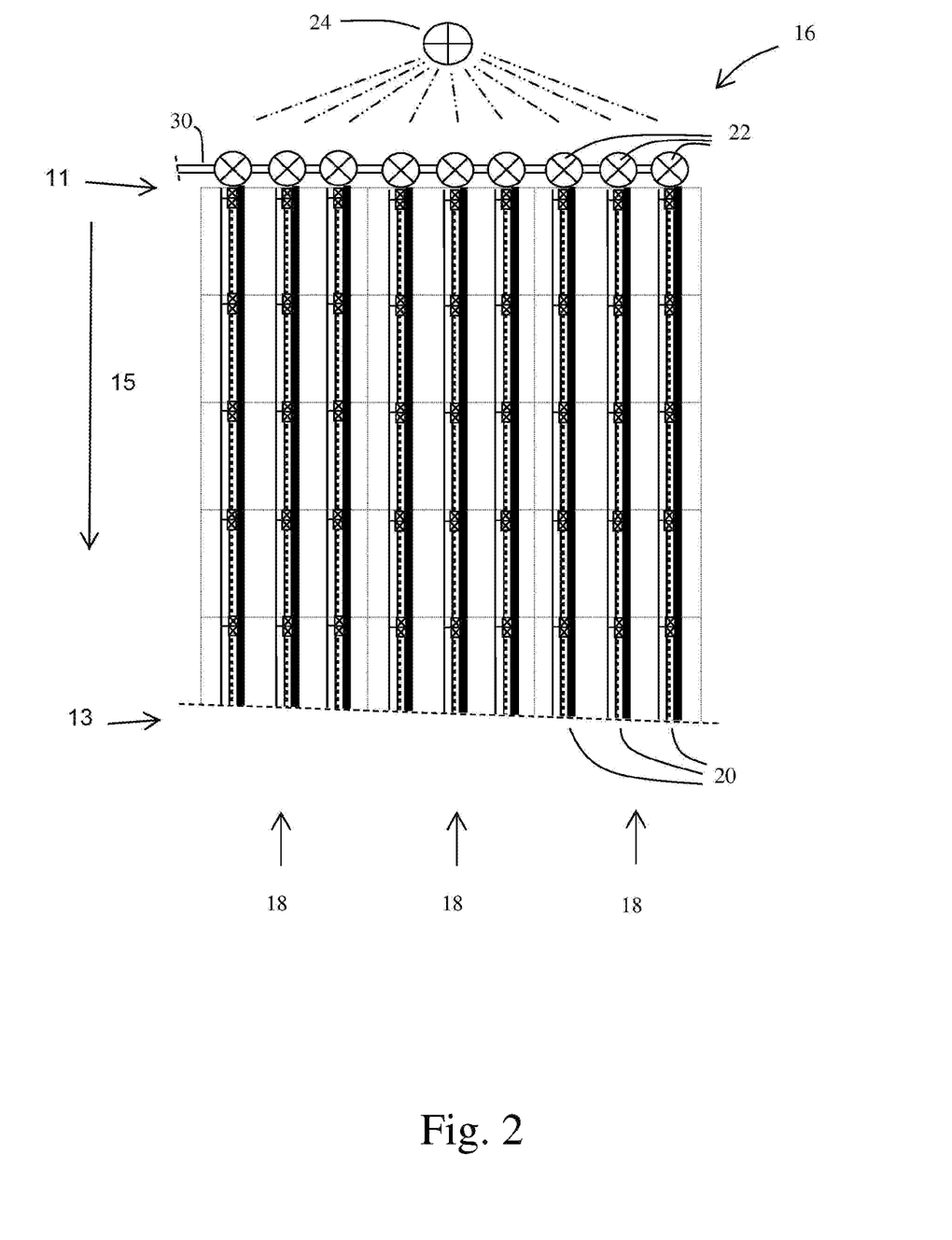
FIG. 2 schematically shows an embodiment of an irrigation system for irrigating the field of FIG. 1, including irrigation strips overlying strips of zones.

Attention is drawn to FIG. 2 illustrating an embodiment of an irrigation system 16 installed for irrigating field 10. Irrigation system 16 includes irrigation strips 18 each configured to irrigate a respective strip 14 of field 10 that extend in the column direction of the field. A main distribution pipe 30 of system 16 configured to provide irrigation fluids/liquids and/or substances to the irrigation strips 18 of system 16, extends laterally along a row direction of the field, at the field's upstream end 11.

Each irrigation strip 18 in this example includes three irrigation columns 20 having each a column control device 22 located at an upstream end. A possible main controller 24 in wire or wireless communication with each control device 22 may also be provided in irrigation system 16, here optionally located also at an upstream side of the system.

Thus, in an aspect of the present invention, in at least certain embodiments such as illustrated in FIG. 2; all (or most) control devices (e.g. forming at least part of elements 22, 24), which are possibly electrically and/or computerized activated devices—are preferably located alongside an upper row of zones of the field and/or outside of an irrigated portion of the field. Configuring embodiments of irrigation systems in such manner may permit easy installation of such system and/or ease of maintenance e.g. in case of failure and/or malfunction of such controllers that consequently can be easily accessed without substantially entering the zones of the field where e.g. crops, vegetation and/or other agricultural installations are located.

Figure 3:
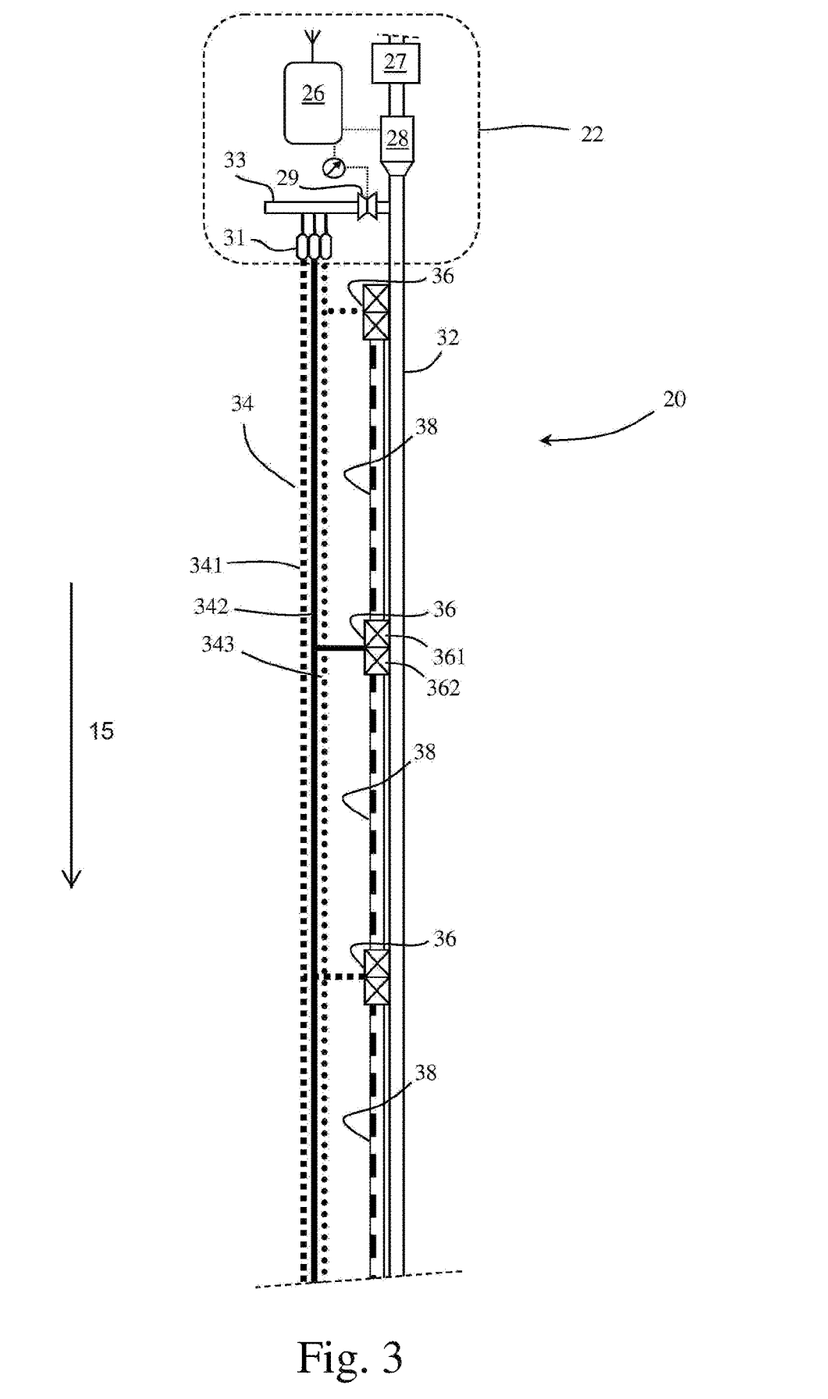
FIG. 3 schematically shows an embodiment of an irrigation column possibly belonging to an irrigation strip e.g. of the irrigation system in FIG. 2.

Attention is drawn to FIG. 3 illustrating a possible arrangement of an irrigation column 20 according to at least certain embodiments of the invention. Control device 22 in this embodiment includes a column controller 26 (possibly being an electrically and/or computerized activated device), a possible filter 27 and flow meter 28. Control device 22 may further include a control flow sensor 29 and an actuator manifold 31, possibly an electrically activated manifold.

A fluid conducting line 32 of column 20 in fluid communication at an upstream end with distribution pipe 30 may be configured to extend downstream via optional devices 27 and 28 to conduct fluid(s) and/or liquid(s) downstream along column 20. An actuator manifold 31, here belonging/associated to control device 22, may be in fluid communication with distribution pipe 30, here via a conduit branch 33 that branches off from distribution pipe 30 and passes via control flow sensor 29. Possibly, other fluid/liquid sources (not shown) may provide liquid/fluid to actuator manifold 31.

A control bundle 34 of column 20 in fluid communication at an upstream end with actuator manifold 31 may be configured to extend downstream therefrom alongside distribution pipe 32; and irrigation column 20 may include a plurality of here spaced apart zone valves 36 configured to control e.g. branching-off, of fluid(s) and/or liquid(s) from distribution pipe 32 towards respective drip line segment 38 extending each alongside a portion of distribution pipe 32.

In an embodiment of the invention, at least some zone valves 36 may include two valve segments 361, 362. Each of the two segments may be a valve configured to permit liquid flow, the two valves being co-located and/or arranged in a common housing, and configured to respond to a common control signal. A first one of the segments 361 ("first valve segment") can be in fluid/liquid communication with a downstream end of a respective (upstream located, first) drip line segment 38, in order to control opening of that first drip line segment's downstream end to the ambient environment. A second one of the segments 362 ("second valve segment") can be in fluid/liquid communication with an upstream end of a respective (downstream located, second) drip line segment 38, in order to control opening of that second drip line segment's upstream end for communication with pressurized fluid/liquid present in conducting line 32. Thus, at least some of the drip line segments 38 each have a first valve segment 361 and a second valve segment 362 at opposite downstream and upstream ends, respectively, the first valve segment 361 and the second valve segment 362 of a given drip line segment 38 belonging to different zone valves 36.

Control lines may be used to control the zone valves with control signals. In some embodiments, the control lines are in the form of hydraulic control tubes. Control bundle 34 may include a plurality of control tubes, in this example three such control tubes 341, 342, 343. Each control tube is in fluid/liquid communication at an upstream end with a respective actuator within actuator manifold 31. In the figures, the control tubes are marked by different line types (dashed, dotted and un-broken (solid) line types). Each control tube may be in fluid/liquid communication, in this example, with a respective one of the zone valves 36 in order to control actuation of the valve and its segments 361, 362.

In some embodiments (not shown), the zone valves 36 may not necessarily include two segments 361, 362. For example, in one example such valves 36 may include only one valve segment (e.g. second valve segment 362) effectively permitting downstream flow from conducting line 32 to a downstream located drip line segment, without being connected to an upstream located drip line segment for permitting opening of its downstream end (as in segment 361).

Figures 4A, 4B:
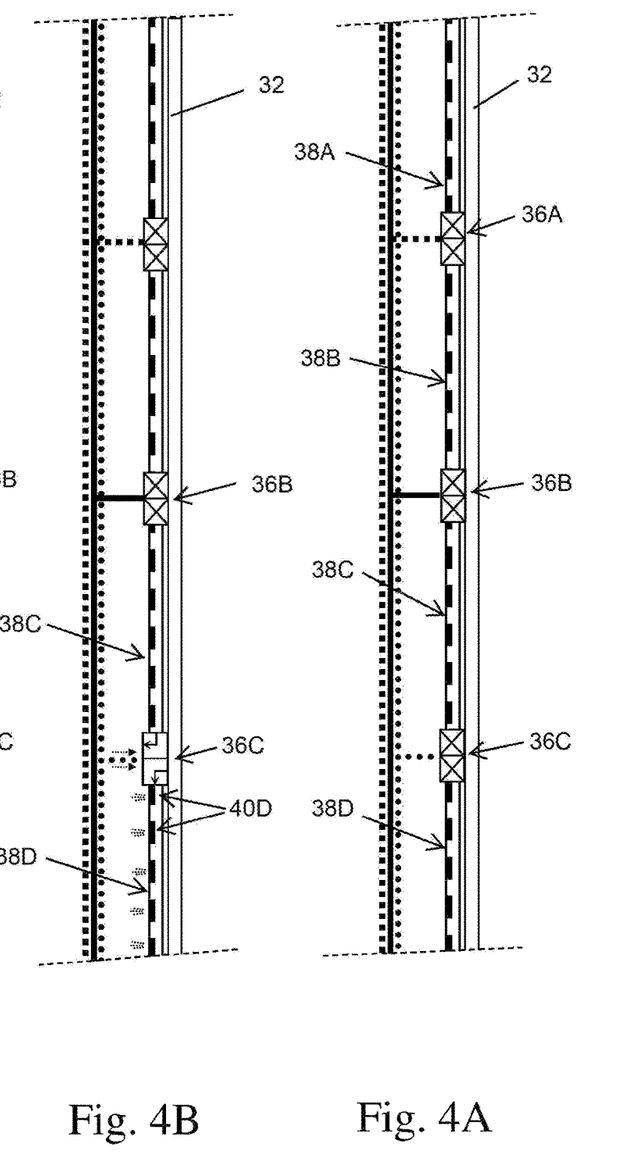
FIGS. 4A to 4C schematically show various modes of activation of an embodiment of an irrigation column such as that in FIG. 3.
Figure 4C:
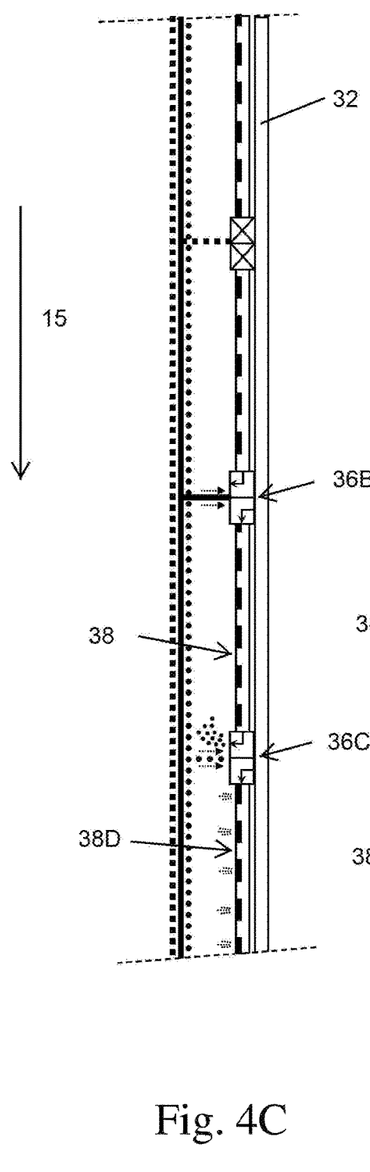

Attention is drawn to FIGS. 4A to 4C illustrating various modes of control of fluid/liquid flow paths via an irrigation column 20 according to at least certain embodiments of the invention. In the embodiment depicted in FIGS. 4A to 4C each zone valve 36A, 36B, 36C has two valve segments 361, 362. Also, each zone valve 36A, 36B, 36C is seen to be associated with a corresponding upstream drip line segment 38A, 38B, 38C, respectively, and a corresponding downstream drip line segment 38B, 38C, 38D, respectively.

In FIG. 4A all the zone valves 36A, 36B, 36C of column 20 are in non-actuated states. That is to say that all first valve segments 361 of the zone valves are maintained in a closed state blocking the downstream end of each one of the drip line segments 38A, 38B, 38C located immediately upstream therefrom. And, all second valve segments 362 of the zone valves 36A, 36B, 36C are also maintained in a closed state blocking downstream flow from the pressurized conducting line 32 of the irrigation column 20 to respective drip line segments 38B, 38C, 38D located downstream from each valve. In some embodiments, when all valve segments 361, 362 are closed, substantially no fluid flows in the pressurized conducting line 32 and irrigation column 20 occupies a substantially fully closed state in which substantially no irrigation takes place from that irrigation column.

In FIG. 4B a lowermost zone valve 36C has been actuated to open by a control signal in the form of fluid/liquid pressure communicated via one of the control tubes to the valve, here the control tube marked by the 'dotted' line. The actuation of this zone valve 36C is also marked in this figure by the two arrows extending alongside the 'dotted' control tube where it meets the valve 36C. The opening of this zone valve 36C forms a first flow path out of the drip line segment 38C immediately upstream and a second flow path from conducting line 32 into the drip line segment 38D immediately downstream of this valve. In other embodiments, other forms of control signals may also be used to actuate valve 36, such as wireless, electrical, optical, acoustic, etc.

Since the drip line segment (here the lower most segment 38D), which is exposed from upstream to incoming fluid/liquid pressure from the conducting line; is closed at its downstream end (not shown)—the pressurized fluid/liquid entering this segment is urged to be emitted to the ambient environment via the emitters 40D that are located along this drip line segment 38D as illustrated. As to the drip line segment 38C located immediately upstream, since its upstream end at zone valve 36B remains closed to communication with conducting line 32, even though its downstream end is open, no fluid/liquid is urged to be flushed downstream out of this segment's downstream open end at zone valve 36C.

FIG. 4C illustrates the configuration explained with respect to FIG. 4B, however with the penultimate zone valve (i.e. the middle zone valve 36B) also being activated to open. The activation of this zone valve 36B to open is performed by a control signal in the form of fluid/liquid pressure communicated via one of the control tubes to the valve, here the control tube marked by the 'un-broken' line. The actuation of this zone valve 36B is also marked in this figure by the two arrows extending alongside the 'un-broken' control tube where it meets the valve 36B.

Since the drip line segment 38C downstream to this middle valve 36B and in communication from upstream with the middle valve—is still maintained open at its downstream end at zone valve 36C, fluid/liquid entering this drip line segment 38C at zone valve 36B is urged to be flushed downstream out of this drip line segment 38C to perform a cleaning action of this segment by flushing debris/grit that may have accumulated therein e.g. during previous use.

Figure 5:
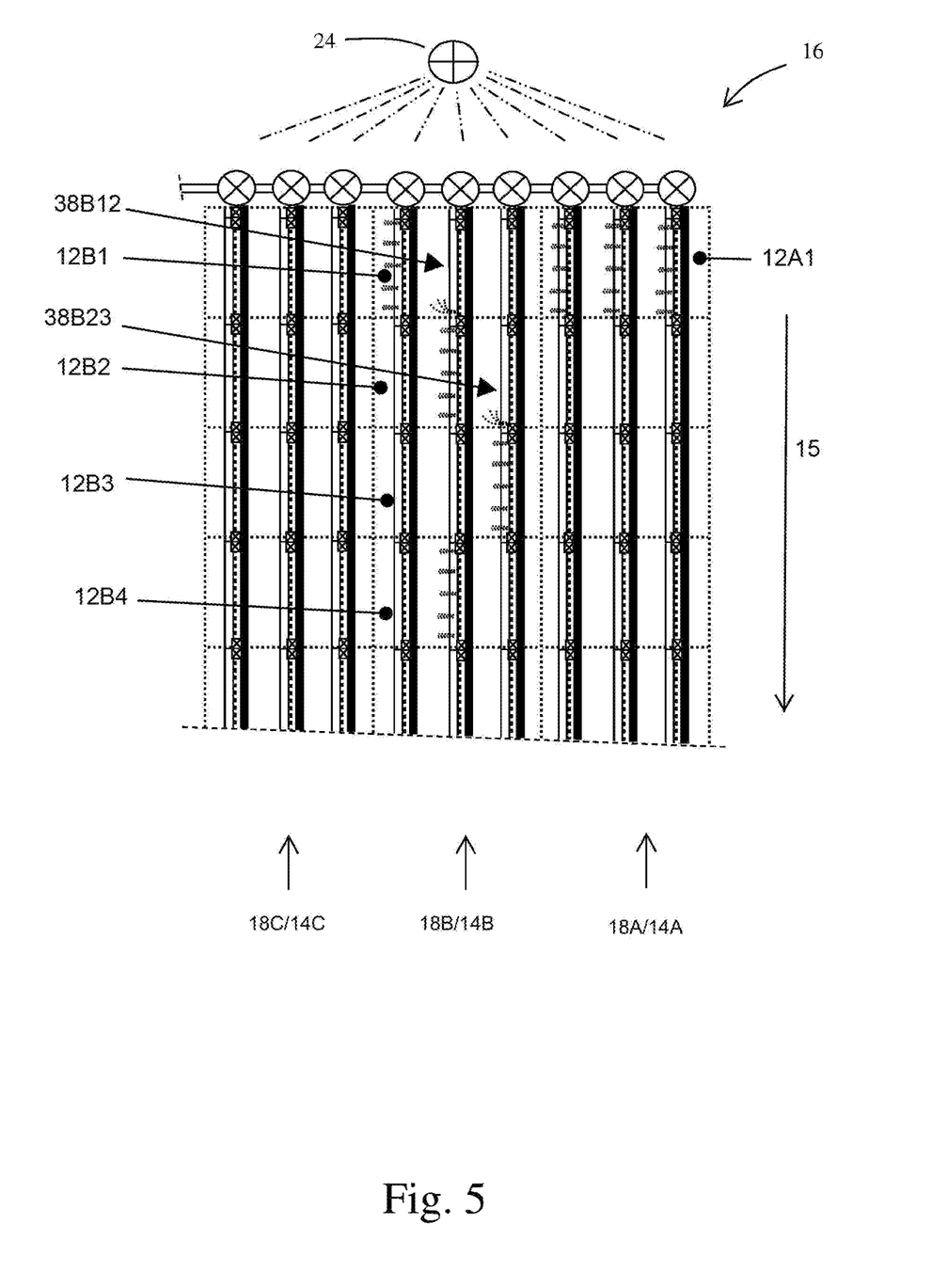
FIG. 5 schematically shows various modes of activation of an irrigation system such as that in FIG. 2.

Attention is drawn to FIG. 5 illustrating various sequences of irrigation that may be activated to occur according to at least certain embodiments of the invention. In this example, all the drip line segments at the upper zone of the right-hand field-strip 14A and/or irrigation strip 18A have been activated to perform a drip irrigation sequence, for example, in order to provide an amount of irrigation to this zone 12A1 according to precision irrigation techniques or methods applied for determining the amount of irrigation required for this zone.

In the middle field-strip 14B and/or irrigation strip 18B, a possible activation is illustrated exemplifying that not necessarily all drip line segments of a certain zone may be activated simultaneously. In this example, in the upper most zone 12B1 only one of the drip line segments is irrigating, while the remaining drip line segments of this zone 12B1 are shut-off for irrigation and remain idle. Similar scenario is illustrated in the second 12B2, third 12B3 and fourth 12B4 zones of this field-strip 14B and/or irrigation strip 18B.

Provision of a required irrigation dose to a certain zone may therefore be provided in subsequent irrigation cycles where the drip line segments that are presently idle may be activated to provide a dose of irrigation so that a given zone eventually receives its required dosage of irrigation and/or fertigation.

Also illustrated in this example is that two drip line segments, marked 38B12, 38B23 are here also activated to perform a flushing action in order to flush out debris or grit that possibly accumulated therein during previous irrigation cycles. When irrigation is performed using irrigation column embodiments such as those shown in FIGS. 3 and 4; such flushing action can be activated to occur in a drip line segment whose downstream end has been activated to be open; hence resulting in a drip line segment downstream that has been activated to perform a dripping action e.g. when using zone valves including two segments 361, 362.

In an aspect of the present invention, at least certain irrigation schedules and/or methods may be planned/designed to avoid flushing sequences during irrigation cycles, and may rather activate dedicated flushing cycles of drip line segments at other times e.g. when irrigation is not performed.

Figure 6:
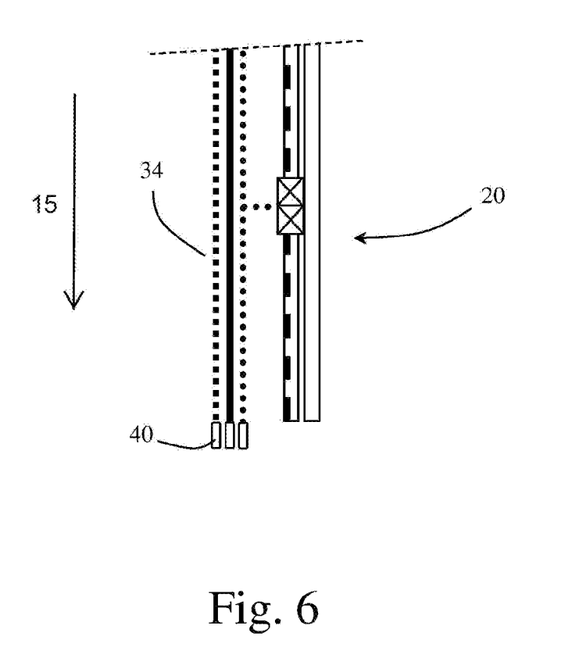
FIG. 6 schematically shows an embodiment of an irrigation column of the present invention.

Attention is drawn to FIG. 6, illustrating a control bundle 34 including drip emitters 40 located at the ends of each control tube. Provision of such emitters 40 may be beneficial in mitigating a certain type of malfunction that may occur in control bundle 34 due to air trapped in the control tubes. Such air, if present within a control tube, will typically be urged out of the control tube via such emitter during use. In a non-binding example, such drip emitters 40 may have a fixed flow rate, for example falling within a range of about 5-10 liter/hour.

In embodiments including emitters at the ends of the control tubes, further monitoring of possible malfunctions in the control tubes may be possible. Such malfunctions may be e.g. breaches occurring in one or more tubes due to pests or the like, or e.g. blockages occurring in one or more tubes during use.

A flow sensor, such as sensor 29 within control device 22, may assist in such monitoring by sensing an overall flow rate (OFR) consumed momentarily and/or over a certain time span, by actuator manifold 31, which may then be compared (e.g. by column controller 26 or main controller 24 or any other controller associated to the irrigation system) to an expected flow rate (EFR) of the manifold due to a known activation pattern of actuators within actuator manifold 31.

For example, if a certain activation pattern requires liquid commands to be channeled in a given actuator manifold 31 via two control tubes to their respective zone valves, then assuming emitters with flow rates of 5 l/h are located at the ends of each control tube, the expected flow rate (EFR) of the given actuator manifold 31 is expected to be about 10 l/h. If in these circumstances the overall flow rate (OFR) in the given actuator manifold 31 is sensed to be substantially different, e.g. 20 l/h—this may indicate possible malfunction such as breach/rupture in one or more of the tubes of manifold 31 or bundle 34.

In another example, if a controller (such as column controller 26 or main controller 24) triggers a certain actuator within given manifold 31 to open, hence under the example above causing the EFR to rise by a delta of 5 l/h, while the sensed OFR either substantially fails to rise or rises substantially more than 5 l/h—then respective conclusions of blockage or breach in the activated tube may be monitored/reached.

In some embodiments, a smaller change than expected in flow rate in response to activation of a certain given actuator, may be interpreted as incomplete actuator operation and may initiate a retry process with higher energy for actuation of the given actuator. Higher changes (on activation) may be interpreted accordingly as leak/breach/rupture in a command tube, issuing an alert with directions to the location of the leaking command tube, e.g. for maintenance personnel.

Attention is drawn back to FIG. 3 to discuss additional examples of stand-alone monitoring abilities that may be present in at least certain embodiments of the invention, where here flow meter 28 may be utilized for such monitoring. Flow meter 28 measuring the total flow rate channeled through the conducting line 32, is expected each time a zone valve is activated or deactivated, to change in a magnitude generally similar e.g. to the expected nominal flow rate of the drip line segment located immediately downstream of the zone valve and in communicating therewith.

Recording changes lower than nominal flow rate may be interpreted as incomplete operation of a zone valve and possibly initiate a retry process of activation of that zone valve. Higher changes in flow rate may be interpreted as leak in the drip line segment or the zone valve, possibly issuing an alert with direction to the specific zone valve for maintenance personnel.

In at least certain embodiments, installation procedures may be devised easing and/or facilitating installation of at least certain irrigation system embodiments of the invention.

In certain embodiments, the tubes of control bundle 34 may be gripped with evenly spaced clip members (not shown), possibly also used for hanging the bundle on wires extending along e.g. an irrigation strip. Tubes within control bundle 34 may further be coded, e.g. by color codes and/or number coding, generally identical to similar type coding on zone valves to which such tubes are designed to connect. Further, in at least certain embodiments, precise location of each zone valve may be determined by high precision GPS, e.g. via mobile application utilized during installation of an irrigation system.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. An irrigation system configured to irrigate a field having an upstream end and a downstream end, the field comprising a plurality of field strips arranged side-by-side in a row direction of the field, each of said plurality of field strips extending in an upstream-to-downstream column direction transverse to the row direction, the system comprising:
   a main distribution pipe configured to be positioned at the field's upstream end and extending in the row direction;
   one or more irrigation columns in fluid communication with the main distribution pipe via a column control device, each of said plurality of irrigation columns extending in the upstream-to-downstream direction and configured to pass through one of the field strips, each irrigation column comprising:
   a fluid conducting line extending in the upstream-to-downstream direction and configured to carry fluid from the main distribution pipe;
   a plurality of drip line segments arranged one after another in the upstream-to-downstream direction along the fluid conducting line, the plurality of drip line segments including adjacent first and second drip line segments, the first drip line segment being upstream of the second drip line segment, each of said plurality of drip line segments having an upstream end and a downstream end; and
   a plurality of spaced apart zone valves, each of said plurality of spaced apart zone valves located along the fluid conducting line and configured to control fluid flow at: the downstream end of the first drip line segment, and also at the upstream end of the second drip line segment;
   wherein:
   in response to a control signal, a given zone valve is configured to open a first flow path out of the first drip line segment and open a second flow path to supply liquid from the fluid conducting line into the second drip line segment.

2. The irrigation system according to claim 1, wherein:
   opening the first flow path flushes liquid out of said first drip line segment, if the upstream end of the first drip line segment is exposed to incoming liquid; and
   opening the second flow path causes drip irrigation by the second drip line segment, if the downstream end of the second drip line segment is closed.

3. The irrigation system according to claim 2, wherein:
   said given zone valve comprises at least two valve segments, a first valve segment in liquid communication with the downstream end of the first drip line segment and a second valve segment in liquid communication with the upstream end of the second drip line segment.

4. The irrigation system according to claim 1, wherein:
   said given zone valve comprises at least two valve segments, a first valve segment in liquid communication with the downstream end of the first drip line segment and a second valve segment in liquid communication with the upstream end of the second drip line segment.

5. The irrigation system according to claim 4, wherein each irrigation column further comprises:
   a plurality of control lines extending in the upstream-to-downstream direction along the fluid conducting line, each of said plurality of control lines configured to control a corresponding one of said plurality of zone valves.

6. The irrigation system according to claim 5, wherein:
   each of said plurality of control lines comprises a hydraulic control tube; and
   each of said plurality of zone valves is configured to be controlled by a hydraulic control signal.

7. The irrigation system according to claim 1, wherein:
   each of said plurality of field strips has a plurality of irrigation columns passing therethrough.

8. The irrigation system according to claim 7, wherein:
   the field is divided into a plurality of zones;
   each field strip comprises a plurality of zones arranged one-after-another in the upstream-to-downstream direction; and
   the plurality of drip line segments belonging to a single irrigation column, lie in different zones.

9. The irrigation system according to claim 1, wherein:
   the field is divided into a plurality of zones;
   each field strip comprises a plurality of zones arranged one-after-another in the upstream-to-downstream direction; and
   the plurality of drip line segments belonging to a single irrigation column, lie in different zones.

10. The irrigation system according to claim 9, wherein:
    a plurality of irrigation columns pass through at least one of said plurality of zones, with a plurality of drip line segments extending parallel to one another in said at least one zone.

11. A method for irrigating a field having an upstream end and a downstream end, the field comprising a plurality of field strips arranged side-by-side in a row direction of the field, each of said plurality of field strips extending in an upstream-to-downstream direction transverse to the row direction, the method comprising:
    providing an irrigation system comprising at least one fluid conducting line passing through one of said plurality of field strips in the upstream-to-downstream direction, the at least one fluid conducting line selectively in fluid communication with a plurality of drip line segments arranged one after another in the upstream-to-downstream direction along the fluid conducting line, the plurality of drip line segments including adjacent first and second drip line segments, the first drip line segment being upstream of the second drip line segment, each drip line segment having an upstream end and a downstream end; and
    opening a passage suitable for flushing liquid out of the downstream end of the first drip line segment while simultaneously introducing liquid into the second drip line segment from the fluid conducting line.

12. The method according to claim 11, wherein:
    liquid is flushed out of the downstream end of the first drip line segment, only if the upstream end of the first drip line segment is exposed to incoming liquid; and liquid introduced into the second drip line segment irrigates a portion of the field strip downstream from the first drip line segment, only if the downstream end of the second drip line segment is not open.

13. The method of claim 12, wherein: the irrigation system further comprises a zone valve in communication with the downstream end of the first drip line segment and also in communication with an upstream end of the second drip line segment, and
the method comprises:
controlling the zone valve to simultaneously flush liquid out of the first drip line segment and introduce liquid into the second drip line segment from the fluid conducting line.

14. The method of claim 13, wherein the zone valve comprises at least two valve segments, a first valve segment in communication with the downstream end of the first drip line segment and a second valve segment in communication with the upstream end of the second drip line segment and the method comprises:
simultaneously controlling both the first valve segment and the second valve segment of the zone valve.

15. The method of claim 11, wherein: the irrigation system further comprises a zone valve in communication with the downstream end of the first drip line segment and also in communication with an upstream end of the second drip line segment, and
the method comprises:
controlling the zone valve to simultaneously flush liquid out of the first drip line segment and introduce liquid into the second drip line segment from the fluid conducting line.

16. The method of claim 15, wherein the zone valve comprises at least two valve segments, a first valve segment in communication with the downstream end of the first drip line segment and a second valve segment in communication with the upstream end of the second drip line segment and the method comprises:
simultaneously controlling both the first valve segment and the second valve segment of the zone valve.

17. The method of claim 11, wherein the field is divided into a plurality of zones and each field strip comprises a plurality of zones arranged one-after-another in the upstream-to-downstream direction; and
the method further comprises:
sensing flow rate of liquid flowing downstream through the irrigation system, and
determining proper operation of irrigation to each of said plurality of zones according to the sensed flow rate.

18. The method of claim 17, further comprising:
comparing the sensed flow rate in said given zone with a pre-defined known flow rate indicative of proper irrigation of said given zone, to determine proper operation of irrigation in said given zone.

19. The method of claim 17, wherein one or more drip line segments irrigate each zone; and
the method comprises:
determining proper operation of irrigation in said each zone comprises determining proper irrigation of all of said one or more drip line segments within said each zone.

20. An irrigation system configured to irrigate a field having an upstream end and a downstream end, the field comprising a plurality of field strips arranged side-by-side in a row direction of the field, at least one of said plurality of field strips comprising a plurality of zones and extending in an upstream-to-downstream direction transverse to the row direction, the system comprising:
a plurality of drip line segments arranged one after another in the upstream-to-downstream direction, the plurality of drip line segments including adjacent first and second drip line segments, the first drip line segment being upstream of the second drip line segment, the first drip line segment being in a first zone and the second drip line segment being in a second zone adjacent to the first zone, each of said plurality of drip line segments having an upstream end and a downstream end; and
a fluid conducting line extending through said plurality of zones and configured to selectively supply liquid to the second drip line segment; wherein:
the system is configured to simultaneously open a first flow path out of the first drip line segment, and open a second flow path to introduce liquid into the second drip line segment; and
in said second zone, liquid flows in parallel through both the fluid conducting line and the second drip line segment, when said second flow path is opened.

21. The irrigation system according to claim 20, wherein:
opening the first flow path flushes liquid out of said first drip line segment, if the upstream end of the first drip line segment is exposed to incoming liquid; and
opening the second flow path causes drip irrigation by the second drip line segment, if the downstream end of the second drip line segment is closed.

22. An irrigation system configured to irrigate a field having an upstream end and a downstream end, the field comprising a plurality of field strips arranged side-by-side in a row direction of the field, at least one of said plurality of field strips comprising a plurality of zones and extending in an upstream-to-downstream direction transverse to the row direction, the system comprising:
a plurality of drip line segments arranged one after another in the upstream-to-downstream direction, the plurality of drip line segments including adjacent first and second drip line segments, the first drip line segment being upstream of the second drip line segment, the first drip line segment being in a first zone and the second drip line segment being in a second zone adjacent to the first zone, each of said plurality of drip line segments having an upstream end and a downstream end; wherein:
the system is configured to simultaneously open a first flow path out of the first drip line segment, and open a second flow path to introduce liquid into the second drip line segment;
opening the first flow path flushes liquid out of said first drip line segment, if the upstream end of the first drip line segment is exposed to incoming liquid;
opening the second flow path causes drip irrigation by the second drip line segment, if the downstream end of the second drip line segment is closed; and
a zone valve is in communication with the downstream end of the first drip line segment and with the upstream end of the second drip line segment for controlling the simultaneous opening of the first and second flow paths.

23. The irrigation system of claim 22, wherein the zone valve comprises at least two valve segments, a first valve segment in liquid communication with the downstream end of the first drip line segment and a second valve segment in liquid communication with the upstream end of the second drip line segment.

24. The irrigation system of claim 23, further comprising a fluid conducting line;
wherein the second valve segment is configured to control branching off of liquid from the fluid conducting line into the second drip line segment.

25. An irrigation system configured to irrigate a field having an upstream end and a downstream end, the field comprising a plurality of field strips arranged side-by-side in a row direction of the field, at least one of said plurality of field strips comprising a plurality of zones and extending in an upstream-to-downstream direction transverse to the row direction, the system comprising:
a plurality of drip line segments arranged one after another in the upstream-to-downstream direction, the plurality of drip line segments including adjacent first and second drip line segments, the first drip line segment being upstream of the second drip line segment, the first drip line segment being in a first zone and the second drip line segment being in a second zone adjacent to the first zone, each of said plurality of drip line segments having an upstream end and a downstream end; wherein:
the system is configured to simultaneously open a first flow path out of the first drip line segment, and open a second flow path to introduce liquid into the second drip line segment; and
a zone valve is in communication with the downstream end of the first drip line segment and with the upstream end of the second drip line segment for controlling the simultaneous opening of the first and second flow paths.

26. The irrigation system of claim 25, wherein the zone valve comprises at least two valve segments, a first valve segment in liquid communication with the downstream end of the first drip line segment and a second valve segment in liquid communication with the upstream end of the second drip line segment.

27. The irrigation system of claim 26, further comprising a fluid conducting line;
wherein the second valve segment is configured to control branching off of liquid from the fluid conducting line into the second drip line segment.

28. An irrigation column for a drip irrigation system comprising:
a fluid conducting line for receiving fluid from a fluid source upstream,
a plurality of drip line segments extending alongside the fluid conducting line,
a plurality of spaced apart zone valves located along the fluid conducting line, and
a plurality of control tubes extending alongside the fluid conducting line,
wherein each of said plurality of control tubes is in fluid communication with a respective one of the zone valves for actuating said respective one of the zone valves.

29. The irrigation column of claim 28, wherein:
each zone valve is configured to be actuated to an open state upon receipt of a hydraulic control signal via the control tube in communication therewith.

30. The irrigation column of claim 28 wherein, upon actuation, each zone valve is configured to permit downstream flow to a respective drip line segment located downstream from said each zone valve.

31. The irrigation column of claim 28, wherein, upon actuation, each zone valve is configured to open a downstream end of a respective drip line segment located upstream from said each zone valve.

* * * * *